US011013181B2

(12) United States Patent
Lesher et al.

(10) Patent No.: US 11,013,181 B2
(45) Date of Patent: May 25, 2021

(54) ADJUSTABLE INFEED VANES

(71) Applicant: CNH Industrial America LLC, New Holland, PA (US)

(72) Inventors: Joshua Lesher, Bernville, PA (US); Eric Veikle, Lititz, PA (US)

(73) Assignee: CNH Industrial America LLC, New Holland, PA (US)

( * ) Notice: Subject to any disclaimer, the term of this patent is extended or adjusted under 35 U.S.C. 154(b) by 134 days.

(21) Appl. No.: 16/194,901

(22) Filed: Nov. 19, 2018

(65) Prior Publication Data
US 2019/0150365 A1 May 23, 2019

Related U.S. Application Data

(60) Provisional application No. 62/587,658, filed on Nov. 17, 2017.

(51) Int. Cl.
*A01F 12/18* (2006.01)
*A01F 7/06* (2006.01)
*A01F 12/26* (2006.01)
*A01F 12/58* (2006.01)

(52) U.S. Cl.
CPC ............ *A01F 12/181* (2013.01); *A01F 7/067* (2013.01); *A01F 12/26* (2013.01); *A01F 12/58* (2013.01)

(58) Field of Classification Search
CPC .......... A01F 7/067; A01F 7/06; A01F 12/181; A01F 12/26; A01F 12/58
See application file for complete search history.

(56) References Cited

U.S. PATENT DOCUMENTS

| 3,994,304 | A |   | 11/1976 | Todd et al. |
| 4,159,023 | A |   | 6/1979  | Todd et al. |
| 4,249,542 | A |   | 2/1981  | Schuler |
| RE31,257  | E | * | 5/1983  | Glaser ..................... A01F 12/24 |
|           |   |   |         | 460/80 |
| 4,440,179 | A |   | 4/1984  | Bassett et al. |
| 4,900,290 | A |   | 2/1990  | Tanis |
| 5,045,025 | A |   | 9/1991  | Underwood |
| 5,145,025 | A |   | 9/1992  | Tanis et al. |
| 5,688,170 | A | * | 11/1997 | Pfeiffer ..................... A01F 7/06 |
|           |   |   |         | 460/69 |

(Continued)

FOREIGN PATENT DOCUMENTS

| CN | 203057867 U | 7/2013 |
| WO | 2014070397 A1 | 5/2014 |

OTHER PUBLICATIONS

Extended European Search Report for EP Application No. 18.206.257.0 dated Mar. 25, 2019 (7 pages).

*Primary Examiner* — Abigail A Risic
(74) *Attorney, Agent, or Firm* — Peter Zacharias; Patrick Sheldrake

(57) ABSTRACT

A threshing system of an agricultural harvester. The threshing system including a rotor cage surrounding a rotor defining a threshing space there between. The rotor cage has a cut crop entrance, a transition cone defining an infeed to the rotor cage, where the transition cone is positioned to direct crop flow toward the cut crop entrance of the rotor cage. The threshing system also includes an infeed ramp positioned between the rotor cage and the transition cone, where the infeed ramp includes guide vanes for guiding the crop flow from the transition cone into the cut crop entrance of the rotor cage.

20 Claims, 12 Drawing Sheets

(56) References Cited

U.S. PATENT DOCUMENTS

| | | | |
|---|---|---|---|
| 6,830,512 B2 | 12/2004 | Tanis et al. | |
| 7,226,355 B2 * | 6/2007 | Schenk | A01F 12/28 |
| | | | 241/89.1 |
| 7,682,236 B2 | 3/2010 | Buermann et al. | |
| 8,231,446 B2 | 7/2012 | Pope et al. | |
| 9,282,696 B2 | 3/2016 | Regier | |
| 10,716,259 B2 * | 7/2020 | Matousek | A01F 7/062 |
| 2008/0234017 A1 * | 9/2008 | Bundy | A01D 75/182 |
| | | | 460/6 |
| 2009/0209307 A1 * | 8/2009 | Pope | A01F 7/067 |
| | | | 460/68 |
| 2011/0320087 A1 | 12/2011 | Farley et al. | |
| 2013/0137492 A1 * | 5/2013 | Biggerstaff | A01F 12/28 |
| | | | 460/62 |
| 2014/0290200 A1 * | 10/2014 | Trowbridge | A01D 41/1274 |
| | | | 56/11.2 |
| 2017/0105350 A1 | 4/2017 | Ricketts et al. | |
| 2017/0105351 A1 * | 4/2017 | Matway | E05B 83/00 |
| 2017/0231155 A1 * | 8/2017 | Duquesne | A01F 7/062 |
| | | | 460/4 |
| 2018/0160627 A1 * | 6/2018 | Kemmerer | A01F 7/062 |
| 2019/0150366 A1 * | 5/2019 | Flickinger | A01F 12/181 |
| 2019/0174677 A1 * | 6/2019 | Ricketts | A01F 12/18 |

* cited by examiner

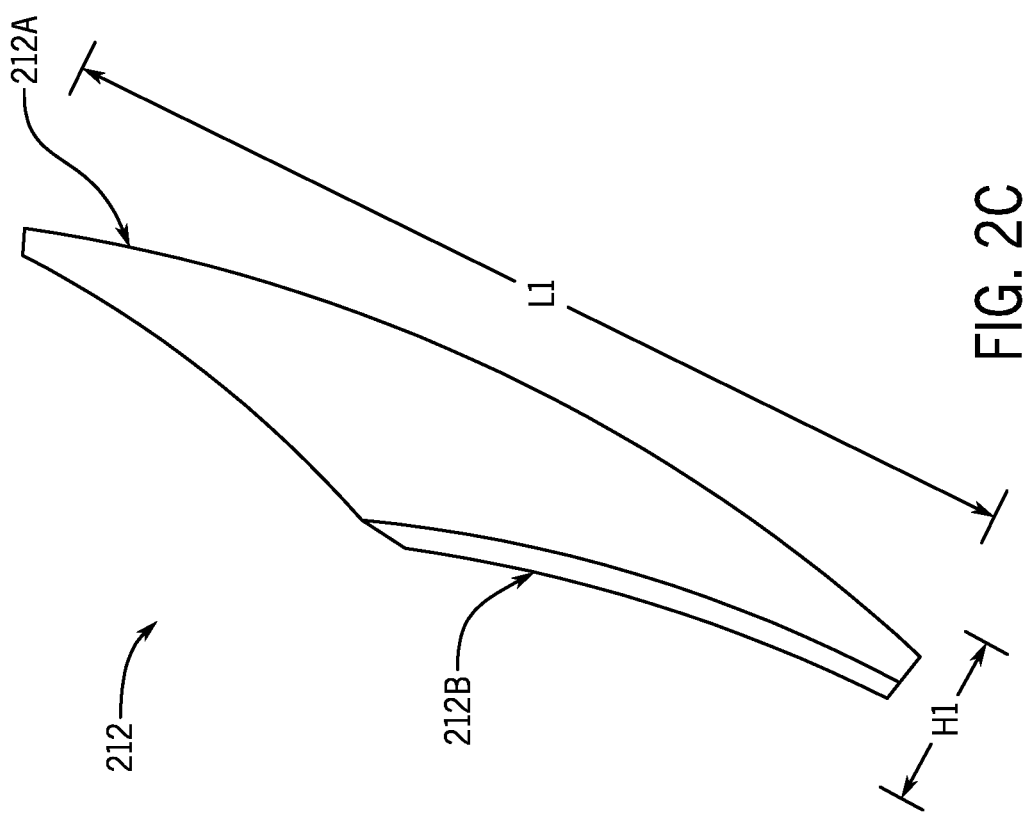

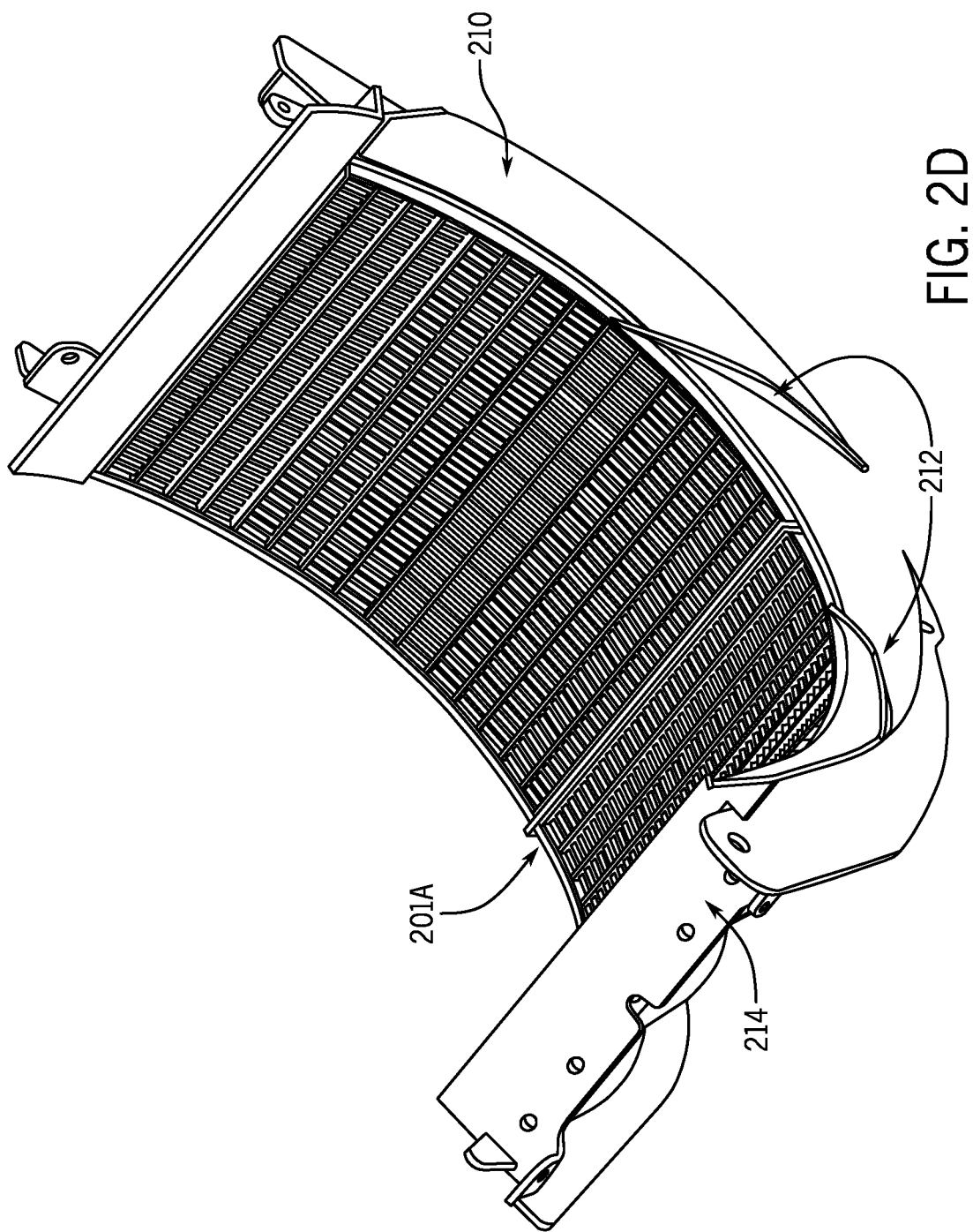

US 11,013,181 B2

ADJUSTABLE INFEED VANES

FIELD OF THE INVENTION

The present invention relates to an infeed ramp between a rotor cage and a transition cone for a combine harvester.

BACKGROUND OF THE INVENTION

A rotary threshing or separating system of an agricultural combine harvester includes one or more rotors which can extend axially (front to rear) or transversely (side to side) within the body of the combine, and which are partially or fully surrounded by a rotor cage having perforated concaves. The crop material is threshed and separated by the rotation of the rotor within the rotor cage. Coarser non-grain crop material known as material other than grain (MOG) are transported to the rear of the combine and discharged back to the field. The separated grain, together with some finer MOG are discharged through the perforated concaves and fall onto a grain pan where they are transported to the cleaning system.

In combines having a rotor operating within a rotor cage, it is known to provide a transition cone and an infeed ramp between a feeder housing and the rotor cage. The transition cone narrows along its length, from the upstream end to the downstream end of the cone. An auger flight operated by the rotor transports the cut crop material through the transition cone, from the feeder housing and into the rotor cage. During use, the crop material tends to follow along the transition cone vane and is somewhat compressed against the inside surface of the narrowing transition cone.

However, crop does not flow directly from the cone to the rotor cage. An infeed ramp acts as an interface between the two. The flow of crop may become hindered by this transition. For example, rather than flowing into the rotor cage, crop entering the infeed ramp may recirculate back to the transition cone (e.g. crop enters the infeed ramp and falls back into the transition cone). This is problematic, because it reduces throughput of the combine and can cause clogs in the threshing system.

SUMMARY OF THE INVENTION

An embodiment includes a threshing system of an agricultural harvester. The threshing system including a rotor cage surrounding a rotor defining a threshing space there between, where the rotor cage has a cut crop entrance, a transition cone defining an infeed to said rotor cage, where the transition cone is positioned to direct crop flow toward the cut crop entrance of the rotor cage, and an infeed ramp positioned between the rotor cage and the transition cone, where the infeed ramp includes guide vanes for guiding the crop flow from the transition cone into the cut crop entrance of the rotor cage.

An embodiment includes an agricultural harvester including a feeder configured to receive harvested crop, a rotor cage surrounding a rotor defining a threshing space there between, where the rotor cage has a cut crop entrance, a transition cone defining an infeed to said rotor cage, where the transition cone is positioned to direct crop flow from the feeder toward the cut crop entrance of the rotor cage, an infeed ramp positioned between the rotor cage and the transition cone, where the infeed ramp includes guide vanes for guiding the crop flow from the transition cone into the cut crop entrance of the rotor cage, and a controller configured to control an actuator to adjust an alignment of the infeed ramp with the transition cone.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 2C is a perspective view of a vane of the infeed ramp, according to an aspect of the present invention.

FIG. 2D is another perspective view of the concave section and the infeed ramp of a combine threshing system, according to an aspect of the present invention.

DETAILED DESCRIPTION OF THE INVENTION

Figure 1:
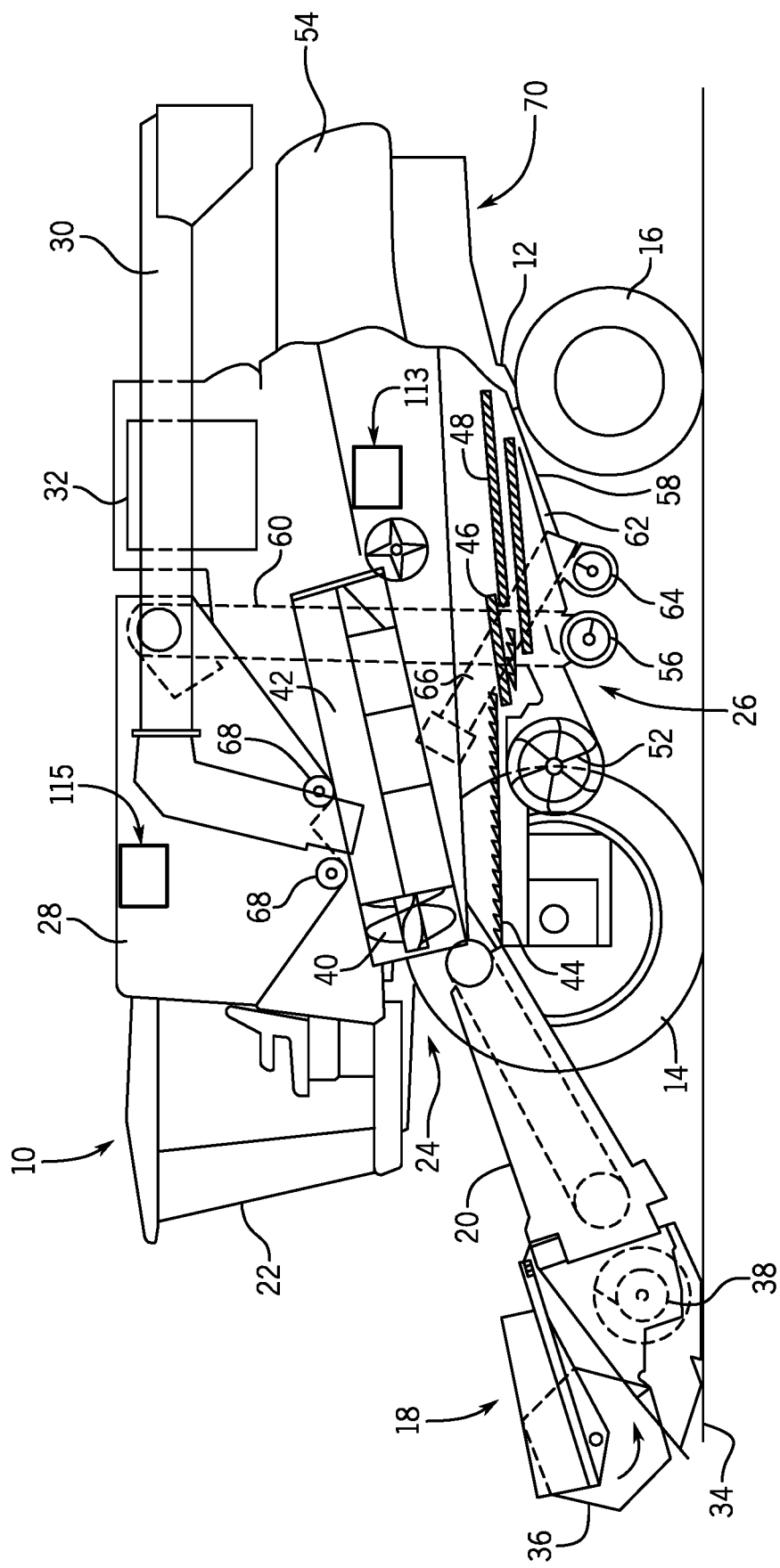
FIG. 1 is a perspective view of a combine, according to an aspect of the present invention.

Corresponding reference characters indicate corresponding parts throughout the several views. The exemplification set out herein illustrates an embodiment of the invention, in one form, and such exemplification is not to be construed as limiting the scope of the invention in any manner.

Aspects of the invention provide a system for increasing throughput of a combine threshing system. The system includes an infeed ramp positioned between a transition cone and a rotor cage. The infeed ramp includes guide vanes. Furthermore, the height of the infeed ramp is controllable.

The terms "grain," "straw," and "tailings" are used principally throughout the specification for convenience but it is to be understood that these terms are not intended to be limiting. Thus "grain" refers to that part of the crop material which is threshed and separated from the discardable part of the crop material, which is referred to as non-grain crop material, material other than grain (MOG) or straw. Incompletely threshed crop material is referred to as "tailings."

Also the terms "forward," "rearward," "left," and "right", when used in connection with the agricultural harvester (e.g. combine) and/or components thereof are usually determined with reference to the direction of forward operative travel of the combine, but again, they should not be construed as limiting. The terms "longitudinal" and "transverse" are determined with reference to the fore-and-aft direction of the agricultural combine and are equally not to be construed as limiting.

Referring now to the drawings, and more particularly to FIG. 1, there is shown an embodiment of an agricultural harvester in the form of a combine 10, which generally includes a chassis 12, ground engaging wheels 14 and 16, a header 18, a feeder housing 20, an operator cab 22, a threshing and separating system 24, a cleaning system 26, a grain tank 28, and an unloading auger 30.

Front wheels 14 are larger flotation type wheels, and rear wheels 16 are smaller steerable wheels. Motive force is selectively applied to front wheels 14 through a power plant in the form of a diesel engine 32 and a transmission (not shown). Although combine 10 is shown as including wheels, is also to be understood that combine 10 may include tracks, such as full tracks or half-tracks.

Header 18 is mounted to the front of combine 10 and includes a cutter bar 34 for severing crops from a field during forward motion of combine 10. Header 18 may be removable from the combine such that headers designed for particular crops are interchangeable. In one example, a rotatable reel 36 feeds the crop into header 18, and a double auger 38 feeds the severed crop laterally inwardly from each side toward feeder housing 20. Feeder housing 20 conveys the cut crop to threshing and separating system 24, and is selectively vertically movable using appropriate actuators, such as hydraulic cylinders (not shown).

Threshing and separating system 24 is of the axial-flow type, and generally includes a transition cone (not shown), an infeed ramp (not shown), and rotor 40 at least partially enclosed by and rotatable within a corresponding perforated rotor cage 42. The cut crops are propelled from feeder housing 20 into threshing system 24 via the transition cone and the infeed ramp. The cut crop is then threshed and separated by the rotation of rotor 40 within rotor cage 42, and larger elements, such as stalks, leaves and the like are discharged from the rear of combine 10. Smaller elements of crop material including grain and non-grain crop material, including particles lighter than grain, such as chaff, dust and straw, are discharged through perforated concaves 42A of rotor cage 42.

Grain which has been separated by the threshing and separating assembly 24 falls onto a grain pan 44 and is conveyed toward cleaning system 26. Cleaning system 26 may include an optional pre-cleaning sieve 46, an upper sieve 48 (also known as a chaffer sieve), a lower sieve 50 (also known as a cleaning sieve), and a cleaning fan 52. Grain on sieves 46, 48 and 50 is subjected to a cleaning action by fan 52 which provides an airflow 112 through the sieves to remove chaff and other impurities such as dust from the grain by making this material airborne for discharge from straw hood 54 of combine 10. Grain pan 44 and pre-cleaning sieve 46 oscillate in a fore-to-aft manner to transport the grain and finer non-grain crop material to the upper surface of upper sieve 48. Upper sieve 48 and lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and in front of lower sieve 50. Clean grain auger 56 receives clean grain from each sieve 48, 50 and from bottom pan 58 of cleaning system 26. Clean grain auger 56 conveys the clean grain laterally to a generally vertically arranged grain elevator 60 for transport to grain tank 28. Tailings from cleaning system 26 fall to a tailings auger trough 62. The tailings are transported via tailings auger 64 and return auger 66 to the upstream end of cleaning system 26 for repeated cleaning action. A pair of grain tank augers 68 at the bottom of grain tank 28 convey the clean grain laterally within grain tank 28 to unloading auger 30 for discharge from combine 10.

The non-grain crop material proceeds through a residue handling system 70. Residue handling system 70 includes a chopper, counter knives, a swath selection door and a residue spreader. When combine 10 operating in the chopping and spreading mode, the chopper is set to a relatively high speed (e.g. 3,000 RPM), the counter knives may be engaged, the swath selection door is closed and the residue spreader is running (e.g. rotating). This causes the non-grain crop material to be chopped in to pieces of approximately 6 inches or less and spread on the ground in a fairly uniform manner. In contrast, when combine 10 is operating in the windrow mode, the chopper is at a relatively low speed (e.g. 800 RPM), the counter knives are disengaged and the swath selection door is open. The residue spreader may continue operation to spread only the chaff, with the crop material passing through the passageway created by the open swath selection door.

Regardless of the operational mode, the combine may monitor both yield and loss of the grain to ensure efficient operation of the threshing and separating system 24. Loss is generally defined as a percentage of grain lost to total grain harvested. Loss includes grain that is accidentally blown by cleaning fan 52 into the straw hood 54 and ejected from the combine rather than collected in the tank. In contrast, yield is generally defined as the amount of grain collected in the tank (e.g. bushels).

Loss may be monitored by a loss sensor 113 positioned within straw hood 54 (see FIG. 1). Loss sensor 113 may be an acoustic sensor that detects certain audible frequencies that are associated with grain hitting the metal frame of straw hood 54. For example, grain (e.g. seeds) may make a distinctive sound as compared to the chaff when they hit the metal frame of straw hood 54. This signal can be sent to a controller (not shown) that counts the number of hits to compute the amount of grain that is lost during operation.

Yield may be monitored by a yield sensor 115 that could be positioned within grain tank 28 (see FIG. 1). Yield sensor 115 may be an acoustic sensor, radar sensor or the like that measures distance to the grain pile, or a pressure sensor that contacts the grain entering grain tank 28.

Throughput is yet another metric that can be determined based on yield. As described above, yield is determined based on signals transmitted and received by yield sensor 115. Throughput is the amount of crop being processed by the combine at a given time. Generally, throughput can be computed by measuring yield over a time period. For example, if the yield sensor detects that grain tank 28 holds 10 bushels at time T, and then detects that grain tank 28 holds 10.1 bushels at time T+6 seconds, the throughput is determined as 1 bushel per minute. In another example, if the yield sensor detects that grain tank 28 holds 10 bushels at time T, and then detects that grain tank 28 holds 10.3 bushels at time T+6 seconds, the throughput is determined as 3 bushel per minute.

Figure 2A:
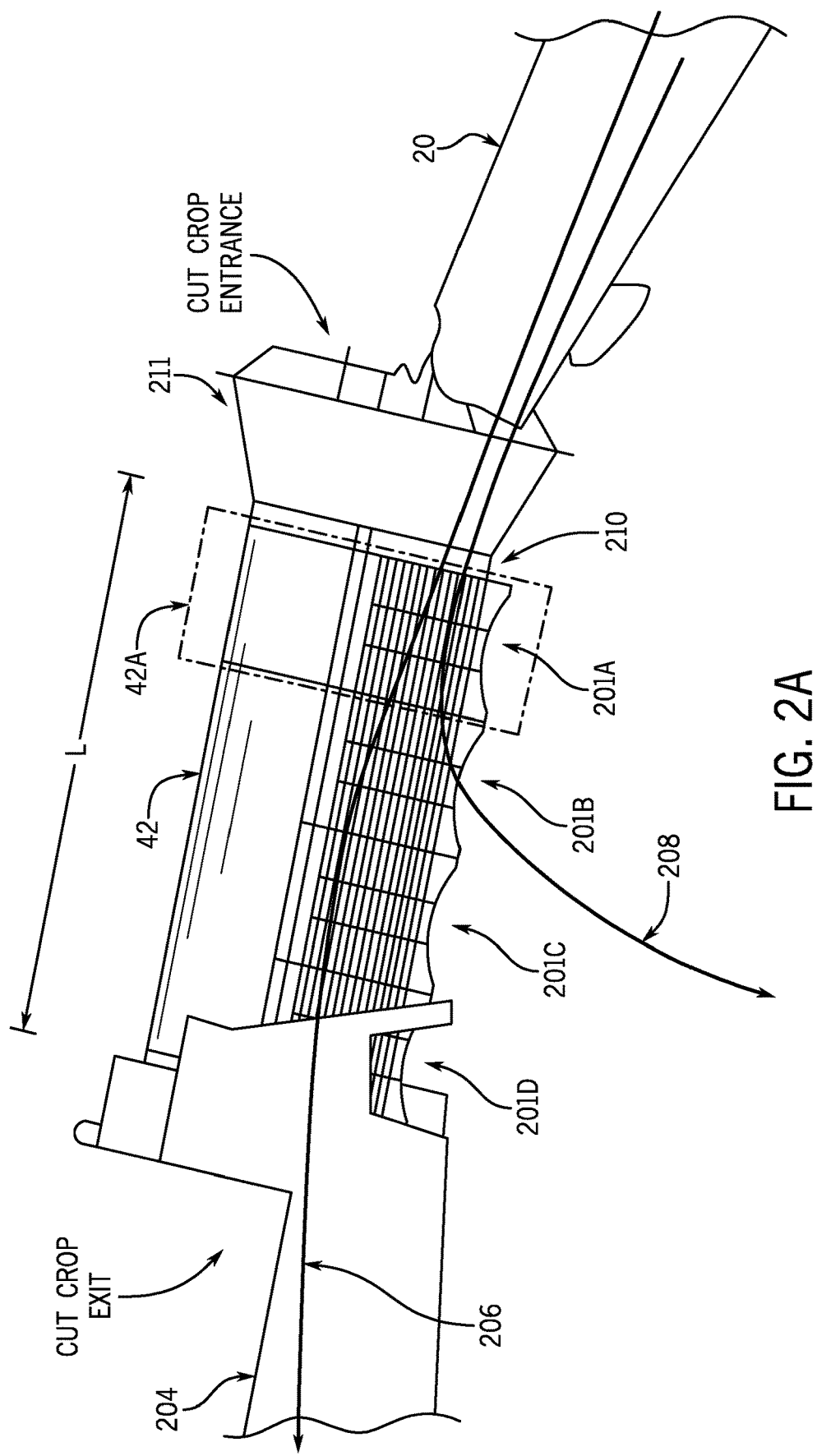
FIG. 2A is a perspective view of a combine threshing system, according to an aspect of the present invention.

FIG. 2A shows a perspective view of threshing system 24 from FIG. 1. As already described, threshing system 24 includes a rotor 40 (not shown) enclosed in rotor cage 42 having an opening on one end referred to as the cut crop entrance point and an opening on the opposite end referred to as the cut crop exit point. Rotor 40 runs axially inside length L of rotor cage 42. During operation, rotor 40 is rotated which causes flights (not shown) of rotor 40 to pull cut crop into the cut crop entrance, and propel this cut crop along the length L of the rotor cage. Due to beating of the crop by rotor flights and the friction between the cut crop and the rotor cage 42, the grain is separated from the MOG. Due to its smaller size, the grain travels along path 208 and falls through one or more of perforated concaves 201A, 201B, 201C and 201D located on the bottom half of rotor cage 42 and into the cleaning and collection system. In contrast, due to its larger size, the MOG travels along path 206 and exits the rotor cage 42 through the cut crop exit. This MOG is then propelled via chute 204 into the residue system of the combine.

As shown in FIG. 2A, rotor cage 42 of threshing system 24 is segmented into smaller sections (e.g. 42A), and also includes two additional components (e.g. transition cone 211 and infeed ramp 210) are included. Transition cone 211 has a cone-like geometry with a wide opening that accepts the cut crop propelled by feeder 20. The cone gradually narrows as it approaches infeed ramp 210. Essentially, transition cone 211 acts as a funnel to funnel the cut crop from the feeder 20 towards infeed ramp 210. Infeed ramp 210 is mounted to the first rotor cage section 42A, and acts as an interface between transition cone 211 and rotor cage section 42A. Although not shown in FIG. 2A, infeed ramp 210 is spaced from transition cone 211 to allow infeed ramp 210 to move up and down with rotor cage section 42A based on various factors including but not limited to crop type, throughput, etc. For example, for a first crop type, the inner surface (not shown) of infeed ramp 210 may be positioned flush with the inner surface of the opening of transition cone 211. However, for a second crop type, infeed ramp 210 may be lowered such that the inner surface (not shown) of infeed ramp 210 is lower than the inner surface of the opening of transition cone 211. This lowered position may be beneficial in certain scenarios based on both crop and combine operational factors. Further details of infeed ramp 210 and rotor section 42A are described below.

Figure 2B:
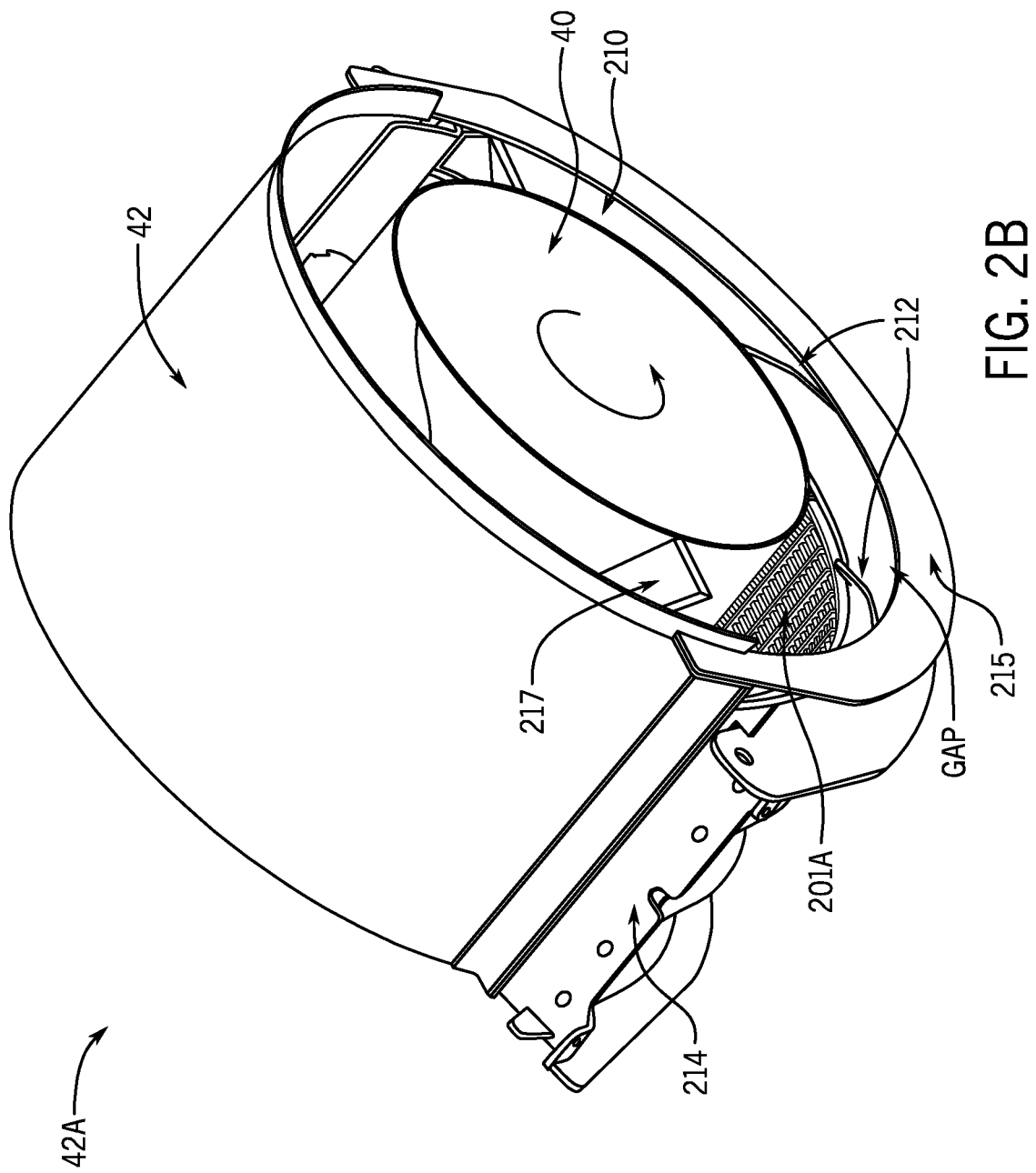
FIG. 2B is a perspective view of a rotor cage section including a concave section and an infeed ramp of a combine threshing system, according to an aspect of the present invention.

A more detailed view of an exemplary interaction between infeed ramp 210, rotor 40 and rotor cage section 42A is shown in the perspective view of FIG. 2B. For example, it is shown that rotor cage section 42A includes a movable perforated concave section 201A connected to a static top of rotor cage section 42 via hinge 214. It is also shown that infeed ramp 210 is connected to perforated concave section 201A, and is also spaced apart by a GAP from plate 215 that abuts the transition cone. The GAP is large enough to allow movement of infeed ramp 210 relative to stationary plate 215, while being small enough to prevent significant loss of grain. Although perforated concave section 201A is hinged to rotor cage section 42 via hinge 214, other equivalent connections are possible that allow perforated concave section 201A to move relative to rotor 40.

It is noted that rotor 40 in FIG. 2B is a different type of rotor than the rotor shown in FIG. 1. Rotor 40 in FIG. 2B is a drum shaped rotor having attached auger flights 217. These auger flights 217 beat the crop as the rotor rotates and propel the crop through the length of rotor cage 42. Although not shown in FIG. 2B, the auger flights 217 extend above guide vanes 212 on infeed ramp 210. This positioning allows the auger flights 217 to beat the crop against the guide vanes, thereby propelling the crop from the transition cone into the rotor cage section 42A.

Guide vanes 212 are angled protrusions that extend from infeed ramp 210 towards rotor 40. As shown in FIG. 2C, guide vanes 212 may have a flat side 212A that contacts (e.g. is mounted to) infeed ramp 210, and a curved side 212B that extends above the infeed ramp 210 towards rotor 40. The guide vanes may also have a height H and length L, where height H is the distance that the guide vanes protrude above infeed ramp 210. The length L is the distance the vane extend from one side of the infeed ramp to the other. The guide vanes also have a width (e.g. thickness) that is sufficient to ensure structural stability during operation.

The geometry (e.g. height, width, length and material) may be selected to facilitate the efficient movement of cut crop from the transition cone into rotor cage section 42A. The physical characteristics of infeed ramp 210 and rotor 40 may also be considered when designing and installing the guide vanes on the ramp.

The guide vanes may be implemented in various manners. For example, the guide vanes may be either molded directly into infeed ramp 210 during molding of infeed ramp 210, or may be installed on infeed ramp 210 after infeed ramp 210 is already molded (e.g. during assembly of the combine). For example, after infeed ramp 210 is molded, separate guide vanes made from a desirable materials (e.g. metal, plastic, rubber, etc.) may then be secured to infeed ramp 210 using fasteners (e.g. screws, bolts, adhesive, weld joints, or the like).

The number of guide vanes, and the placement of the guide vanes on infeed ramp 210, as well as their geometry (e.g. height, width, length, angle, shape, material) may be selected to facilitate the efficient movement of cut crop from the transition cone into rotor cage section 42A. The physical characteristics of infeed ramp 210 and rotor 40 may also be considered when designing and installing the guide vanes on the ramp.

Figure 2E:
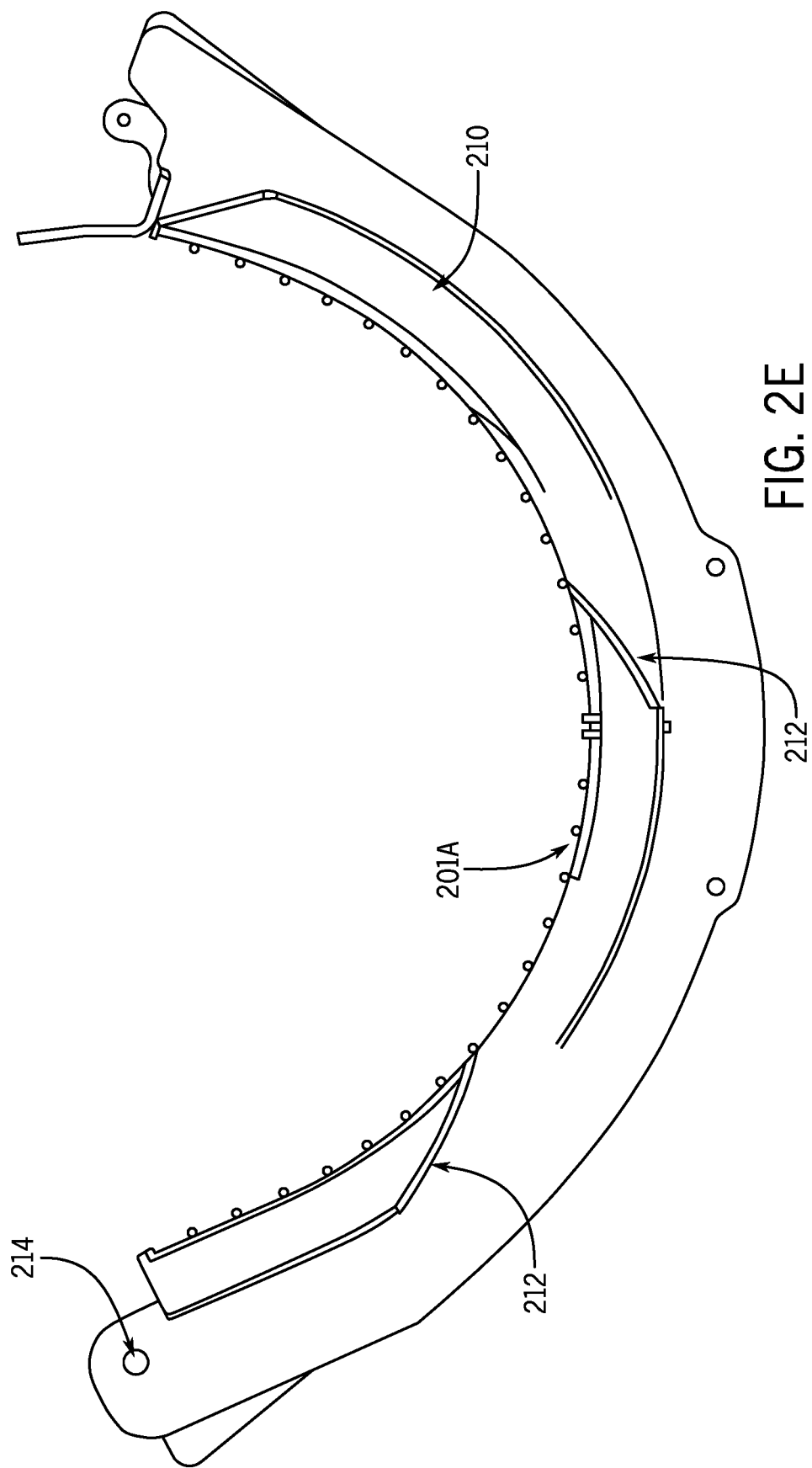
FIG. 2E is a front view of the concave section and the infeed ramp of a combine threshing system, according to an aspect of the present invention.

Further views of the details of infeed ramp 210 from FIG. 2B having guide vanes are shown in FIGS. 2D and 2E. For example, FIG. 2D shows a perspective view of the bottom half of the rotor cage section 42A hinged to the top half of cage 42 (not shown) via hinge 214. In this view, the bottom half of the rotor cage section 42A includes perforated concave section 201A connected to infeed ramp 210 having guide vanes 212 formed thereon. A front view of the bottom half of the rotor cage section 42A in FIG. 2D is shown in FIG. 2E.

Figure 2F:
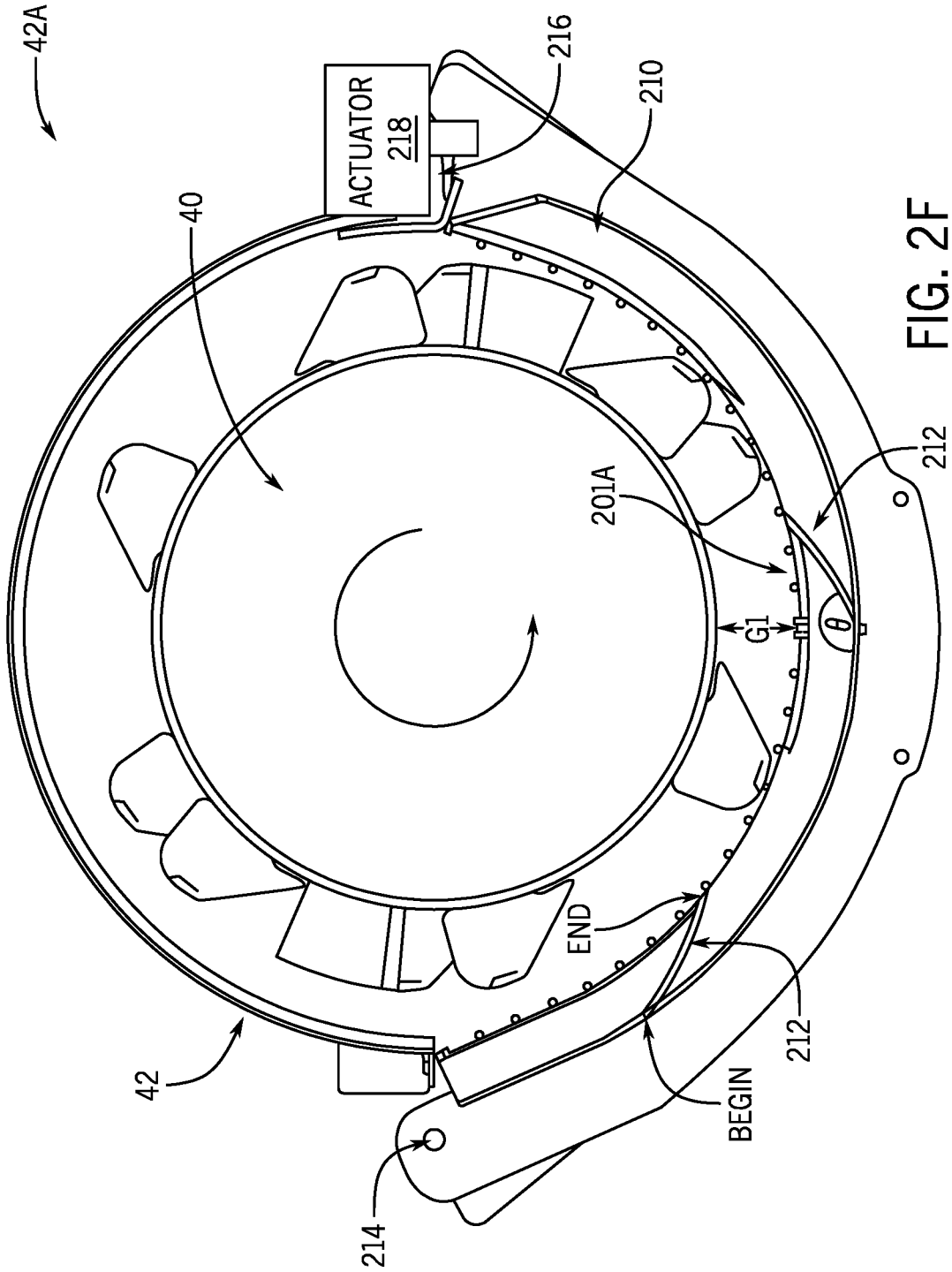
FIG. 2F is a front view of a rotor cage section including a concave section and an infeed ramp positioned with gap G1, according to an aspect of the present invention.
Figure 2G:
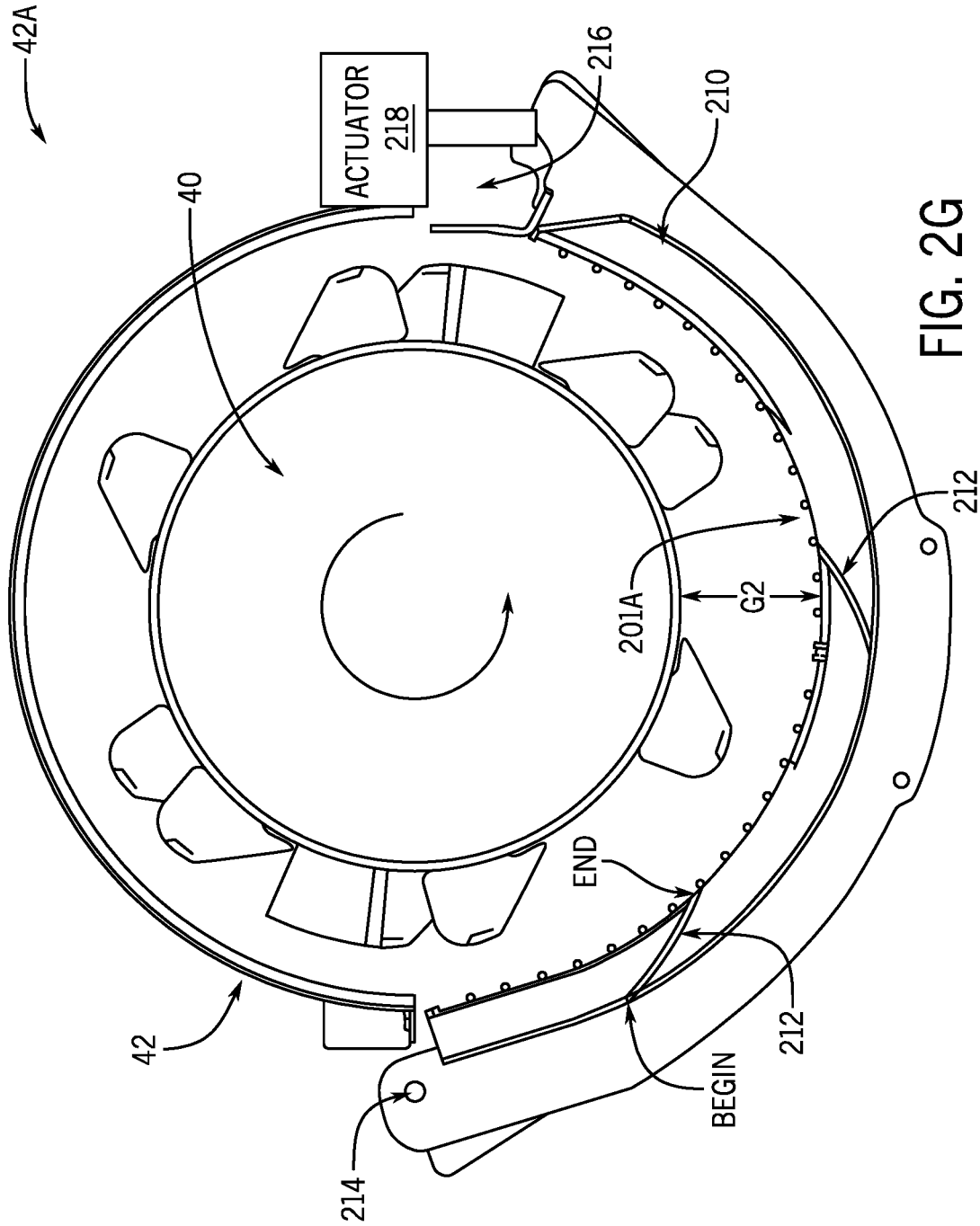
FIG. 2G is a front view of a rotor cage section including a concave section and an infeed ramp positioned with gap G2, according to an aspect of the present invention.

FIGS. 2F and 2G show views of threshing system 24 from the perspective of looking into the cut crop entrance. The transition cone 211 is not shown for illustration purposes. The overall configuration and operation of threshing system 24 will now be described with respect to FIGS. 2F and 2G.

As shown in both FIGS. 2F and 2G, infeed ramp 210 includes guide vanes 212. Guide vanes 212 extend their length L from a BEGIN point on one side of the infeed ramp 210 that is closest to the transition cone 211 to an END point on the opposite side of the infeed ramp 210 closest to perforate concave section 201A. FIGS. 2F and 2G show only two guide vanes. However, it should be noted that there may be more or less guide vanes depending on the geometry of the infeed ramp and other factors.

As described above, guide vanes 212 are angled protrusions that extend from infeed ramp 210 towards rotor 40. Guide vanes 212 have a height, width, length and angle. The height is the distance that the guide vanes protrude from infeed ramp 210. The length is the distance from the BEGIN point to the END point. The angle θ is the attack angle of the guide vanes with respect to the rotor.

It should also be noted that the attack angle of the guide vanes is set to ensure efficient movement of cut crop from transition cone into rotor cage 42. For example, as shown in FIGS. 2F and 2G, the guide vanes are angled to extend from the transition cone towards rotor 40 from the left to the right side of the figure. This angle is chosen, because rotor 40 is rotating in a counter-clockwise direction. If rotor 40 was rotating in a clockwise direction, the guide vanes would have to be angled to extend from the transition cone towards rotor 40 from the right to left side of the figure.

As shown in both FIGS. 2F and 2G, infeed ramp 210 and perforated concave section 201A are connected to a first side of rotor cage 42 via hinge 214, and connected to a second side of rotor cage 42 via actuator 218. Actuator 218 may be a linear actuator (e.g. electromechanical) or the like that has a shaft that extends and retracts based on a control signal from the combine controller. This configuration allows the actuator to maneuver infeed ramp 210 and perforated concave section 201A closer to or further away from rotor 40 (e.g. increase or decrease the gap between the rotor 40 and the perforated section 201A). Some factors that influence desired gap between the infeed ramp and the rotor include crop type (e.g. small grains benefit from a smaller gap; large grains benefit from a larger gap), crop throughput (e.g. higher throughput benefits from a larger gap), crop condition (e.g. hard to thresh crops benefit from a small gap; easy to thresh crops benefit from a large gap).

This action may be beneficial, for example, during the threshing operation, where the hinged state of infeed ramp 210 may be changed to accommodate different crop types. For example, for a first crop type (e.g. small crop), infeed ramp 210 and perforated concave section 201A may be positioned by actuator 218 (e.g. actuator shaft is retracted) close to rotor 40 to produce small gaps G1 and 216 as shown in FIG. 2F. In another example, for a second crop type (e.g. large crop), infeed ramp 210 and perforated concave section 201A may be positioned by actuator 218 (e.g. actuator shaft is extended) further from rotor 40 to produce larger gaps G2 and 216 as shown in FIG. 2G. Although only two hinged states are shown in FIGS. 2F and 2G, it is noted that other hinged states with varying gaps between the rotor 40 and perforated concave section 201A and the rotor are possible based on factors including but not limited to crop type, crop throughput and crop condition.

It is also noted that the hinged state may be adjusted based on one or more of crop type, throughput, loss, user input, etc. In addition, the hinged state can be continuously or periodically changed during threshing. For example, the gap may initially be set small, but then increased if throughput has increased.

Figure 3:
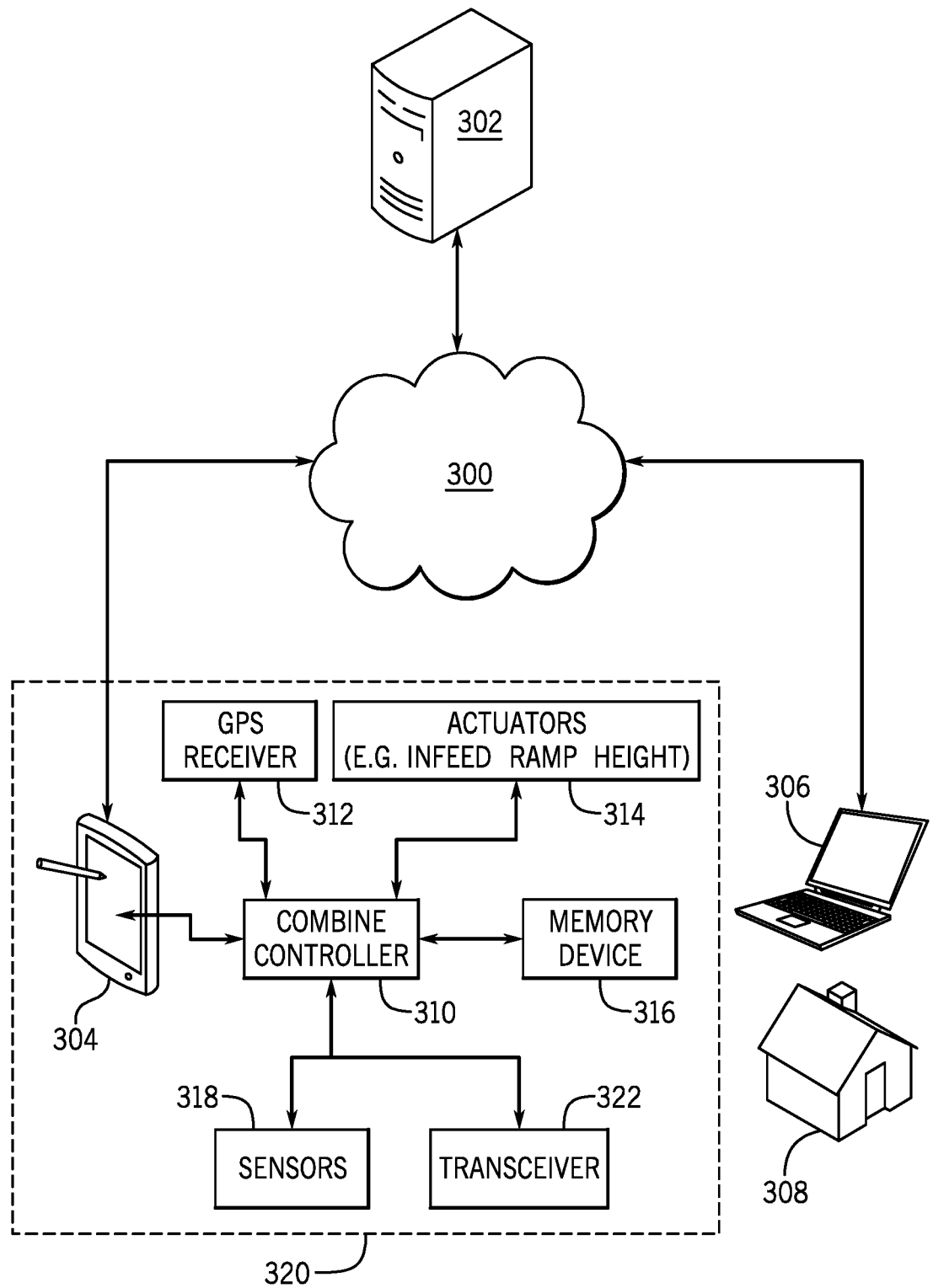
FIG. 3 is a system view of network based communication between the combine controller, a remote personal computer and a server, according to an embodiment of the invention.

Setting the infeed ramp height and the rotor speed is a process that can be performed while in the combine via a user interface, or while remote from the combine via a personal computer (PC). FIG. 3 shows an example of a system for controlling the combine. The system includes an interconnection between a control system 320 of combine 10, a remote PC 306 at location 308, and a remote server 302 through network 300 (e.g. Internet). It should be noted that combine 10 does not have to be connected to other devices through a network. The controller of combine 10 can be a standalone system that receives operating instructions (e.g. infeed ramp height, rotor speed, etc.) through a user interface, or through a removable memory device (e.g. Flash Drive).

Prior to operating combine 10, an operator designates the infeed ramp height and the rotor speed settings. In one example, the operator uses interface 304 of the combine control system or PC 306 located at remote location 308. Interface 304 and PC 306 allow the operator to view locally stored parameters from memory device 316 and/or download parameters via transceiver 322 (e.g. Wi-Fi, Bluetooth, Cellular, etc.) from server 302 through network 300. The operator may select (via Interface 304 or PC 306) appropriate infeed ramp heights and rotor speeds based on various factors including, but not limited to speed thresholds, throughput, loss, yield, type of crop, etc. Once the infeed ramp heights and rotor speeds are selected, the operator can begin harvesting. Combine controller 312 then controls actuators 314 (e.g. infeed ramp actuator and rotor motor) based on these settings. For example, sensors 318 (e.g. yield sensor) may be used during harvesting to determine throughput. Throughput may be used to adjust infeed ramp heights and rotor speeds to ensure that the threshing system is operating efficiently. It should also be noted that harvesting may also be tracked and aided by GPS receiver 312.

Figure 4:
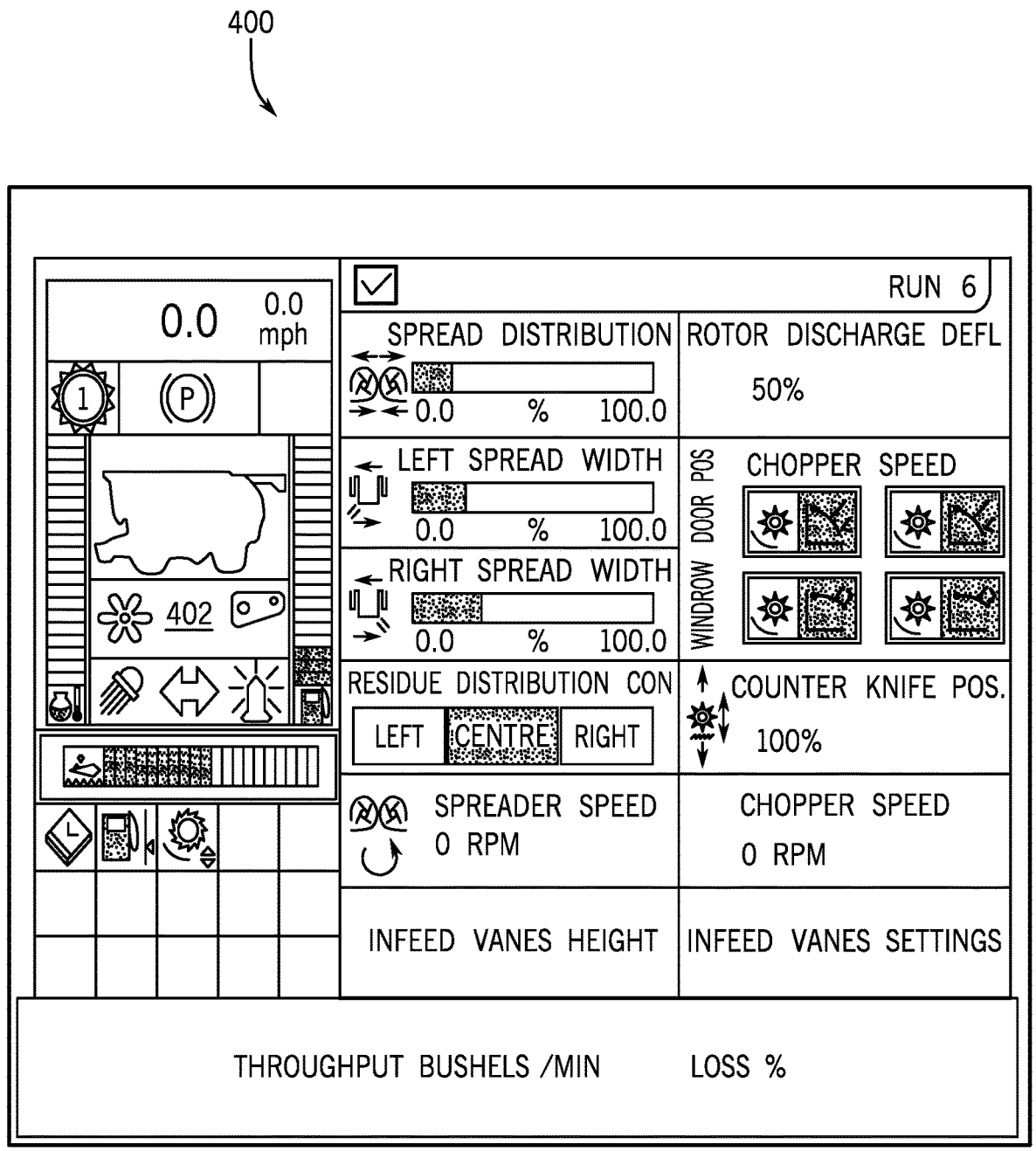
FIG. 4 is an illustration of a user interface for monitoring and controlling the combine, according to an embodiment of the invention.

An example of interface 304 is shown in FIG. 4 wherein various parameters and data are displayed to the operator through a graphical user interface (GUI) 400. These may include a view of map 402 with designated zones, land grade (not shown), current operational mode (spreading/windrow modes), and operational parameters/states for the spreader wheels, chopper states, rotor speed, infeed ramp height (e.g. gap to rotor), counter knives, windrow door, etc. These parameters may be set or changed by the operator prior to harvesting or during harvesting. For example, the operator can use a stylus or their finger on the touchscreen to select the infeed ramp height (e.g. gap to rotor) and rotor speed settings.

Figure 5A:
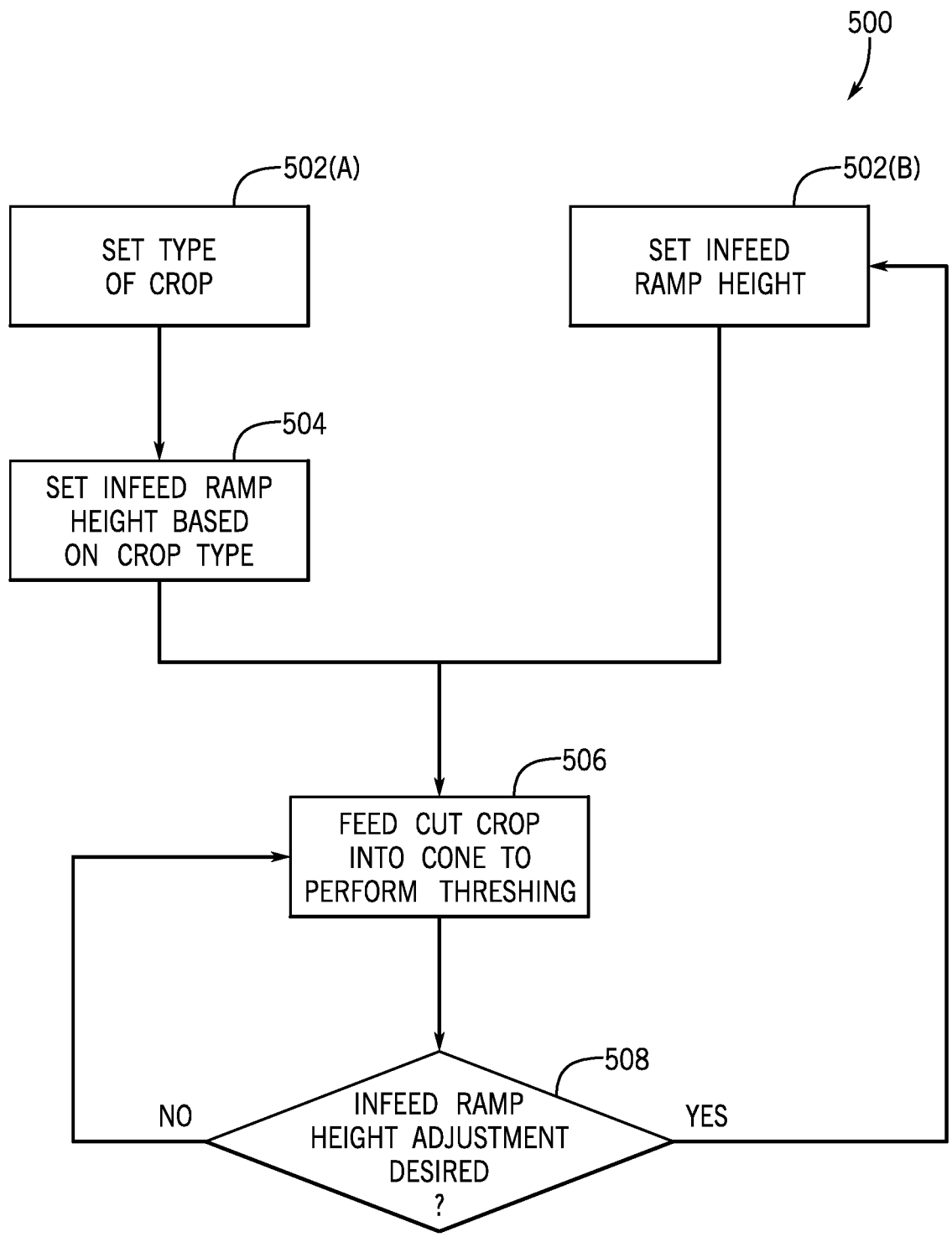
FIG. 5A is a flowchart of steps for controlling the infeed ramp gap based on crop type, according to an embodiment of the invention.

FIG. 5A shows a flowchart of the hinged operation 500 of infeed ramp 210 and perforated concave section 201A based on input settings. In FIG. 5A, the operation of the infeed ramp may be based on crop type or based on user height settings. For example, in step 502(A), the user can use the GUI 400 to enter the type of crop being harvested. Controller 312 then retrieves data from its memory device 316 to determine an appropriate infeed ramp height based on the crop type (step 504). Alternatively, the operator can set the infeed ramp height based on experience (step 502). In either scenario, the cut crop is fed into the transition cone 211 (step 506). The flights 217 on the rotor then beat the cut crop against the guide vanes 212 of the infeed ramp 210. The guide vanes 212 help propel the cut crop from the transition cone 211 into the rotor cage section 42A for further threshing. In step 508, the controller 312, or the operator may determine if the height of infeed ramp 210 and perforated concave section 201A needs adjustment. This determination may be based on throughput, loss or other factors measured during harvesting. If no adjustment is desired, then the combine keeps feeding cut crop into the transition cone for threshing. If adjustment is desired, then the either the controller 312 or the operator adjusts the height of infeed ramp 210 and perforated concave section 201A using actuator 218.

Figure 5B:
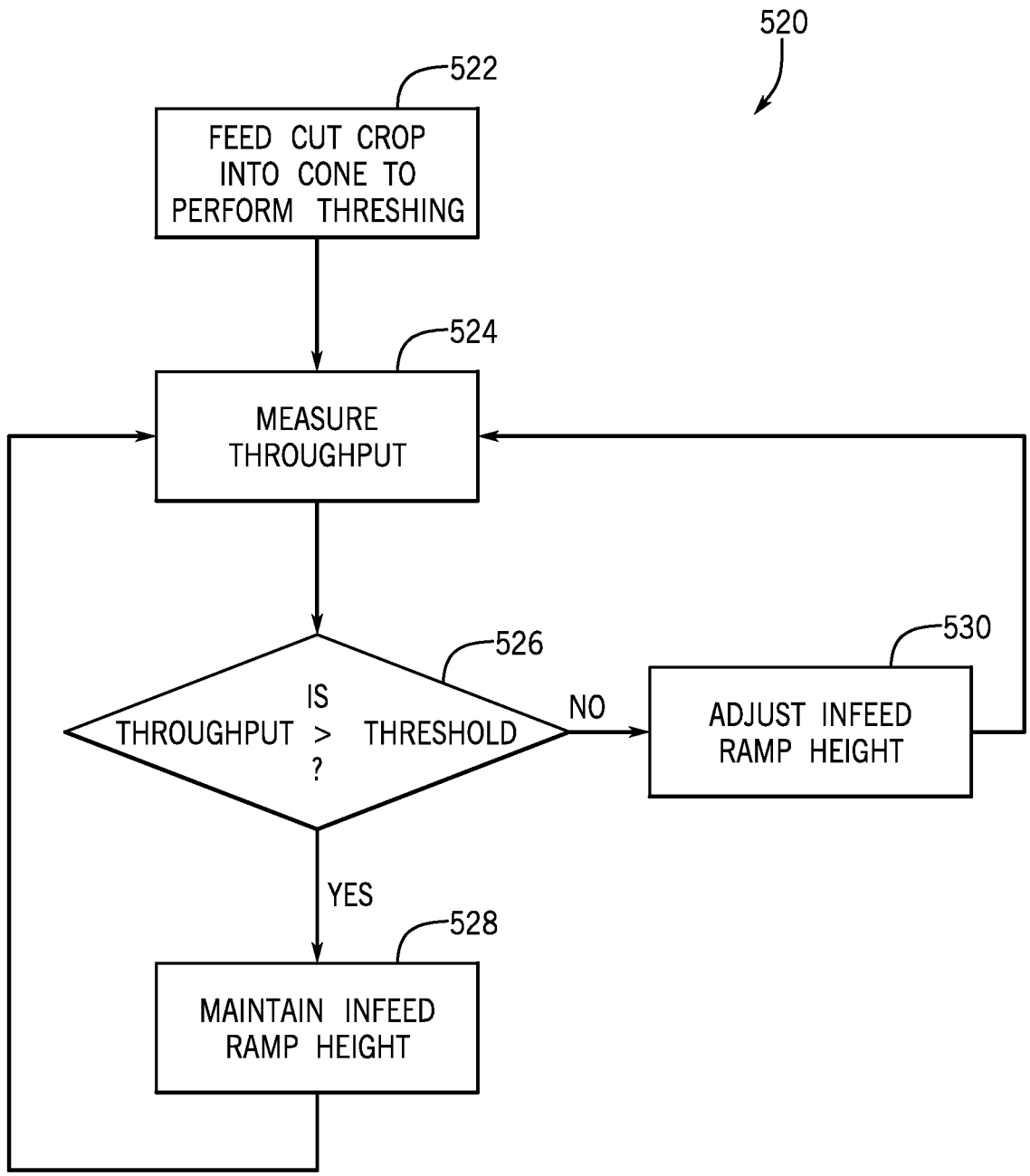
FIG. 5B is a flowchart of steps for controlling the infeed ramp gap based on throughput, according to an embodiment of the invention.

FIG. 5B shows a flowchart of the hinged operation 520 of the infeed ramp 210 based on measured parameters. In FIG. 5B, the operation of infeed ramp 210 and perforated concave section 201A may be based on throughput. For example, in step 522, the combine feeds the cut crop into the threshing system. The rotor flights 217 beat the cut crop against the guide vanes 212 of the infeed ramp 210. The guide vanes 212 help propel the cut crop from the transition cone 211 into the rotor cage section 42A for threshing. Controller 312 then measures a parameter of the cut crop such as throughput (step 524). In step 526, the controller 312 determines if the throughput is above a desired threshold. If the throughput is above the threshold, then in step 528, the combine maintains the infeed ramp height and keeps feeding cut crop into the transition cone 211 for threshing. If, however, the throughput is not above the threshold, then in step 530, the combine adjusts (e.g. increases or decreases) the height of infeed ramp 210 and perforated concave section 201A using actuator 218 and continues feeding cut crop into the transition cone 211 for threshing.

Regardless of the method for adjusting the height of infeed ramp 210 and perforated concave section 201A using actuator 218, the guide vanes provide traction for the cut crop. As the rotor 40 rotates and beats the cut crop against the guide vanes of the infeed ramp, the guide vanes help propel the cut crop from the transition cone into the rotor cage for threshing.

The steps of adjusting the height of the infeed ramp shown in steps 502-508 and 522-530 of FIGS. 5A and 5B are performed by controller 310 upon loading and executing software code or instructions which are tangibly stored on a tangible computer readable medium 316, such as on a magnetic medium, e.g., a computer hard drive, an optical medium, e.g., an optical disc, solid-state memory, e.g., flash memory, or other storage media known in the art. Thus, any of the functionality performed by the controller 310 described herein, such as the steps shown in FIGS. 5A and 5B, are implemented in software code or instructions which are tangibly stored on a tangible computer readable medium. Upon loading and executing such software code or instructions by the controller 310, the controller 310 may perform any of the functionality of the controller 310 described herein, including the steps shown in FIGS. 5A and 5B described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A threshing system of an agricultural harvester comprising:
a rotor cage surrounding a rotor defining a threshing space there between, the rotor cage having a cut crop entrance;
a transition cone defining an infeed to said rotor cage, the transition cone positioned a distance from the rotor cage to direct crop flow toward the cut crop entrance of the rotor cage, the distance defining a gap between the transition cone and the rotor cage; and
an infeed ramp connected to a section of the rotor cage, and positioned to span the gap by extending at least a portion of the distance from the rotor cage to the transition cone, the infeed ramp including guide vanes for guiding the crop flow from the transition cone into the cut crop entrance of the rotor cage, the infeed ramp and the section of the rotor cage being adjustable relative to the transition cone.

2. The threshing system of claim 1, wherein the infeed ramp is positionable relative to the rotor.

3. The threshing system of claim 2, wherein the infeed ramp is hinged at a distance relative to the rotor such that the infeed ramp is positioned to be flush with the transition cone.

4. The threshing system of claim 2, wherein the infeed ramp is hinged at a distance relative to the rotor such that the infeed ramp is positioned to be below the transition cone.

5. The threshing system of claim 2, wherein a controller of the agricultural harvester controls an actuator to adjust the hinged distance of the infeed ramp based on at least one of crop type, user input distance settings or crop throughput.

6. The threshing system of claim 1, wherein the guide vanes of the infeed ramp extend at an angle relative to the longitudinal axis of the rotor from the transition cone towards the rotor cage.

7. The threshing system of claim 1, wherein the guide vanes of the infeed ramp extend in a direction of the rotor rotation from the transition cone towards the rotor cage.

8. The threshing system of claim 1, wherein the guide vanes are at least one of metal, rubber or plastic.

9. The threshing system of claim 1, wherein the guide vanes are molded into the infeed ramp.

10. The threshing system of claim 1, wherein the guide vanes are fastened to the infeed ramp by fasteners.

11. An agricultural harvester comprising:
a feeder configured to receive harvested crop;
a rotor cage surrounding a rotor defining a threshing space there between, the rotor cage having a cut crop entrance;
a transition cone defining an infeed to said rotor cage, the transition cone positioned a distance from the rotor cage to direct crop flow from the feeder toward the cut crop entrance of the rotor cage, the distance defining a gap between the transition cone and the rotor cage;
an infeed ramp connected to a section of the rotor cage, and positioned to span the gap by extending at least a portion of the distance from the rotor cage to the transition cone, the infeed ramp including guide vanes for guiding the crop flow from the transition cone into the cut crop entrance of the rotor cage; and
a controller configured to control an actuator to adjust an alignment of the infeed ramp and the section of the rotor cage with the transition cone.

12. The agricultural harvester of claim 11, wherein the infeed ramp is hinged to the rotor cage and the controller is further configured to control the actuator to position the infeed ramp relative to the rotor.

13. The agricultural harvester of claim 12, wherein the controller is further configured to control the actuator to position the infeed ramp at a distance relative to the rotor such that the infeed ramp is positioned flush with the transition cone.

14. The agricultural harvester of claim 12, wherein the controller is further configured to control the actuator to position the infeed ramp at a distance relative to the rotor such that the infeed ramp is positioned below the transition cone.

15. The agricultural harvester of claim 12, wherein the controller is further configured to control the actuator to position the infeed ramp based on at least one of crop type, user input distance settings or crop throughput.

16. The agricultural harvester of claim 11, wherein the guide vanes of the infeed ramp extend at an angle relative to the longitudinal axis of the rotor from the transition cone towards the rotor cage.

17. The agricultural harvester of claim 11, wherein the guide vanes of the infeed ramp extend in a direction of the rotor rotation from the transition cone towards the rotor cage.

18. The agricultural harvester of claim 11, wherein the guide vanes are at least one of metal, rubber or plastic.

19. The agricultural harvester of claim 11, wherein the guide vanes are molded into the infeed ramp.

20. The agricultural harvester of claim 11, wherein the guide vanes are fastened to the infeed ramp by fasteners.

\* \* \* \* \*